Figure 1:
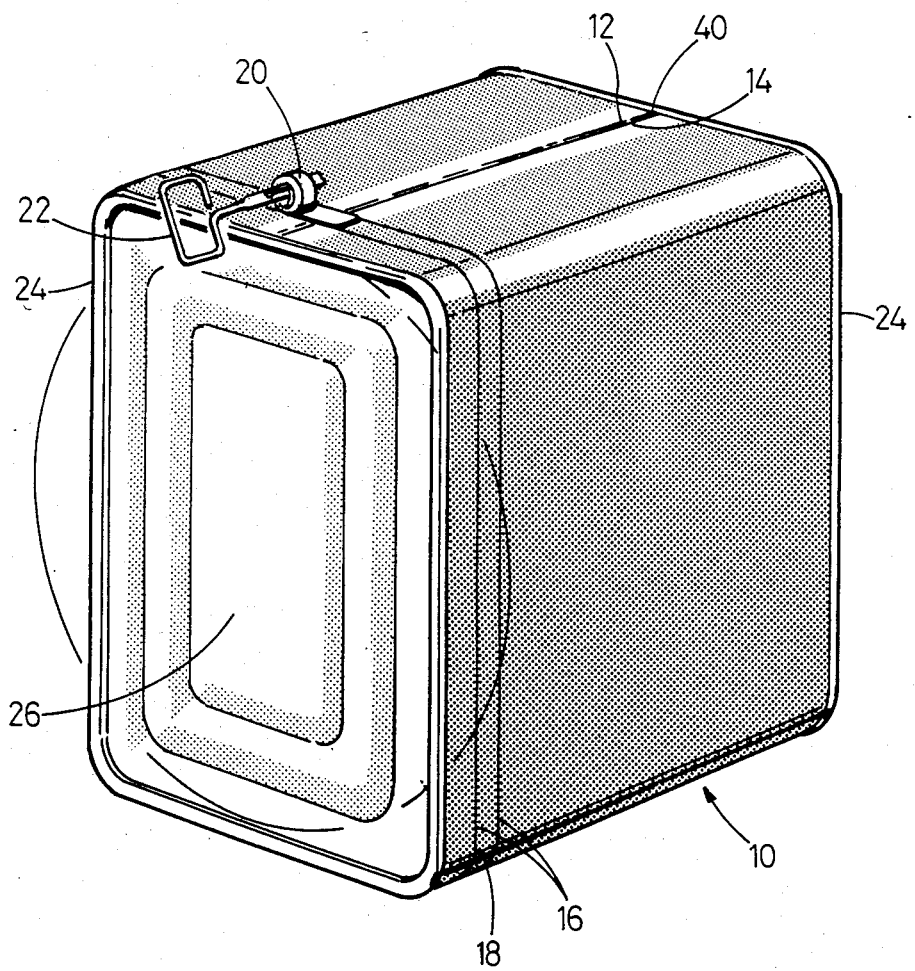

United States Patent [19]

Opprecht et al.

[11] Patent Number: 4,637,521
[45] Date of Patent: Jan. 20, 1987

[54] OPENABLE CAN BODY

[75] Inventors: Paul Opprecht, Bergdietikon; Werner Urech, Kaiserstuhl; Jürg Opprecht, Widen, all of Switzerland

[73] Assignee: Elpatronic AG, Switzerland

[21] Appl. No.: 754,340

[22] Filed: Jul. 11, 1985

[30] Foreign Application Priority Data

Jul. 12, 1984 [CH] Switzerland .................. 3404/84

[51] Int. Cl.$^4$ .............................................. B65D 17/36
[52] U.S. Cl. .................................... 220/274; 220/276
[58] Field of Search ........................ 220/274, 275, 276

[56] References Cited

U.S. PATENT DOCUMENTS 2,806,628 9/1957 Morrill et al. ...................... 220/274
3,838,787 10/1974 McCloskey ........................ 220/274

Primary Examiner—George T. Hall
Attorney, Agent, or Firm—McCormick, Paulding & Huber

[57] ABSTRACT

A can body is rolled from a sheet-metal blank (28) and has outer and inner longitudinal edges (12 and 14 respectively) which are welded to one another in an overlapping manner. Extending round the can body transversely to the longitudinal edges (12, 14) are two circumferential scorings (16) which define a tearing strip (18) laterally. The tearing strip (18) is extended by a tongue (20) which is welded onto the outer longitudinal edge (12) and which can be gripped by a key and rolled up. In a welding zone (42) which is adjacent to a starting scoring (30), the tearing strip (18) is stiffened by the welded-on tongue (20) in such a manner that it tears away from the can body reliably along the circumferential scorings (16) during the rolling up of the tongue (20).

9 Claims, 6 Drawing Figures

OPENABLE CAN BODY

The invention relates to an openable can body made from a sheet-metal blank with
- an outer and an inner longitudinal edge which are welded to one another in an overlapping manner,
- at least one pair of circumferential scorings, which extend round the can body transversely to the longitudinal edges and define a tearing strip laterally, and
- a tongue which extends the tearing strip beyond the outer longitudinal edge.

In a known can body of this type (DE-B 1 017 042), the tongue is stamped out in one piece together with the sheet-metal blank which is planar in the initial state and the tongue extends in the plane of the blank beyond the edge of the outer longitudinal edge. A starting scoring which connects the circumferential scorings to one another is stamped in the sheet-metal blank, together with these circumferential scorings, in the region of the inner longitudinal edge. Before the welding of its two longitudinal edges the sheet-metal blank is rolled to form a cylinder so that the two longitudinal edges overlap one another. In the course of this, the starting scoring of the inner longitudinal edge comes to lie under the outer longitudinal edge. The starting scoring may, for example, be a straight line which extends parallel to the edge of the inner longitudinal edge; in this case, after the rolling of the cylinder, the starting scoring coincides with the edge of the outer longitudinal edge. The starting scoring may, however, also be in the shape of a triangle or a segment of a circle, the base of which forms the edge of the inner longitudinal edge. After the welding of its longitudinal edges, a complete can is formed from such a can body in that the two ends of the can body are closed by a cover and a bottom respectively, by beading over. In order to open the can, a key is placed on the tongue, which key has a slit for this purpose and is rolled on the nearest beaded edge.

Such can bodies with a welded longitudinal seam and an integral tongue projecting beyond that seam have long been widely distributed and are gradually supplanting the can bodies with a longitudinal seam which is folded and then soldered, which have been known for a considerably longer time and which likewise have a tongue stamped out in one piece with the sheet-metal blank of the can body. With all these known can bodies, inexperienced users in particular do not always succeed in removing the tearing strip completely in the desired manner. Not infrequently, the tearing strip tears off already in the region of the longitudinal seam or shortly behind it because converging cracks originating from the tongue form and meet in the middle between the two circumferential scorings. The user is then forced to continue the opening of the can with a tool which is not provided for this purpose, in which case there is a danger of him injuring himself on the sharp sheet-metal edges resulting.

It is therefore the object of the invention to develop further a can body of the type described at the beginning in such a manner that it can be opened with greater reliability.

According to the invention, the problem is solved in that the tongue is welded as a separate sheet-metal part onto the outer longitudinal edge.

Surprisingly, it has been found that better prerequisites for a satisfactory opening operation are provided by welding on a tongue produced separately than by making the tongue integral with the sheet-metal blank from which the can body is rolled. As a result of the welding on of the tongue, an additional stiffening results in the region of the longitudinal seam between the two circumferential scorings and contributes substantially to the fact that cracks formed during the rolling up of the tongue follow the circumferential scorings so that the tearing strip can then be rolled up completely and satisfactorily on the tongue.

If, in accordance with a further feature of the invention, the thickness of the sheet-metal of the tongue is 1.5 to 2.5 times as great as the thickness of the sheet-metal blank, the desired stiffening action described reaches an optimum without the rolling up of the tongue being made appreciably more difficult.

It is likewise an advantage if the tongue consists of sheet-metal having a greater strength than the sheet-metal blank.

It is further an advantage if the tongue has prefabricated profiling at least in an end region where it is welded onto the outer longitudinal edge. The profiling contributes to the fact that the tongue becomes rigidly connected to the outer longitudinal edge during the welding on. During the welding of the longitudinal edges, the formation of an oxide layer, which makes the welding on of the tongue more difficult, is actually inevitable or can only be avoided by special precautions. This difficulty is overcome by the profiling provided on the tongue, which profiling penetrates through the oxide layer when the tongue is pressed onto the outer longitudinal edge.

The profiling is preferably formed by sharp-edged longitudinal ribs on the tongue.

The invention can be used to particular advantage on a can body with a starting scoring between the circumferential scorings, in the region of the inner longitudinal edge. In this case, however, it is an advantage if the starting scoring has a spacing from the outer longitudinal edge which is two to three times as great as the thickness of the sheet-metal blank. In this manner, the starting scoring is reliably prevented from getting into the welding zone during the welding on of the tongue and becoming ineffective as a result.

The security against the formation of converging cracks between the two circumferential scorings can be increased by various features of the invention which develop it further. These include the feature that the starting scoring extends beyond the two associated circumferential scorings by a distance which is two to three times as great as the thickness of the sheet-metal blank. Thus the effect is achieved that, during the rolling up of the welded-on tongue, the starting scoring breaks open beyond the two circumferential scorings and then cracks originating from the two ends of the starting scoring are formed, each of which leads into the adjacent circumferential scoring in the region of the overlapping longitudinal edges welded to one another and, as a result, offers additional assurance that the tearing operation will be continued along the circumferential scorings.

A further measure for increasing the security against the formation of converging cracks in the region between the circumferential scorings consists in that the tongue is welded to the outer longitudinal edge over 85 to 95% of the width of the tearing strip. As a result of such welding, the tearing strip is stiffened substantially over its whole width in the region of the longitudinal seam, so that the circumferential scorings are loaded substantially only with shearing forces and with practically no tensile forces during the rolling up. This type of loading is particularly conducive to tearing along the circumferential scorings. At the same time, the restriction of the width of the welding zone to 95% of the width of the tearing strip, during the welding on of the tongue, ensures that the circumferential scorings lie outside the welding zone.

A further measure which contributes to allowing cracks to form along the circumferential scorings during the rolling up of the welded-on tongue consists in that the outer longitudinal edge comprises a notch at the beginning of each circumferential scoring.

In order to produce a can body according to the present invention, a known method (DE-C 2 559 671) wherein a sheet-metal blank provided with circumferential scorings is rolled to form a cylinder and its two overlapping longitudinal edges are welded to one another, may appropriately be further developed. The further development of this method according to the invention consists in that the tongue is only welded onto the outer longitudinal edge between the circumferential scorings after the welding of the longitudinal edges. Thus, above all, the effect is achieved that the rolling of the sheet-metal blank and the welding of the longitudinal edges can be carried out in the same manner as in the case of can bodies without a tongue and tearing strip. The subsequent welding on of the tongue by electrical resistance welding can be carried out with so little energy that the welding seam previously made between the two longitudinal edges of the sheet-metal blank remains substantially unaltered and the inner surface of the can body in the region of the longitudinal seam also remains unharmed. This is of particularly great importance in the case of cans of tin plate (steel sheet tinned on both sides).

In order to carry out the method according to the invention, an apparatus, which is likewise known, with a pair of electrode rollers between which the overlapping longitudinal edges are conveyed (DE-C 2 559 671) is preferably further developed, according to the present invention, in that a further pair of electrodes is disposed behind the electrode rollers in order to weld on the tongue.

The apparatus according to the invention is preferably further developed in that the further pair of electrodes comprises a stationary inner electrode with a cylindrical current transfer surface adapted to the curvature of the rolled sheet-metal blank and an outer electrode with a current transfer surface in the form of a knife-edge or a nipple-like projection.

Examples of embodiment of the invention are described below, with further details, with reference to diagrammatic drawings.

Figure 2:
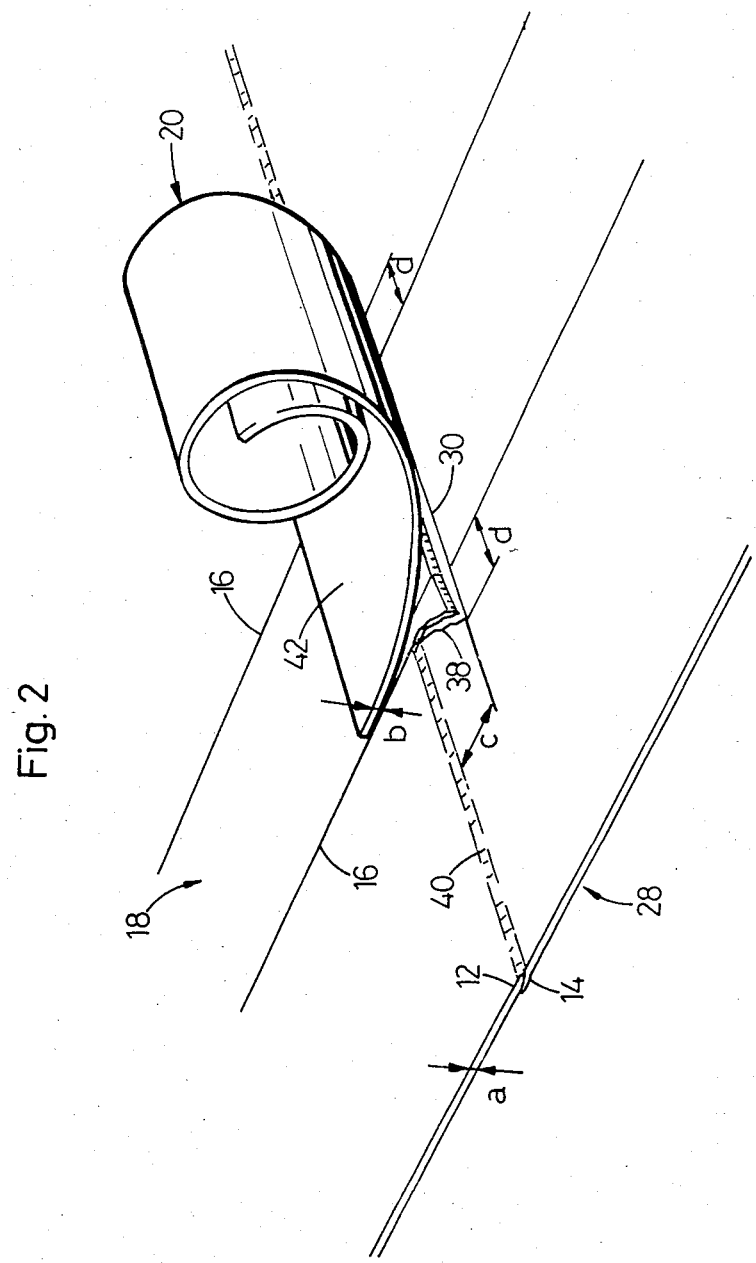
Figure 3:
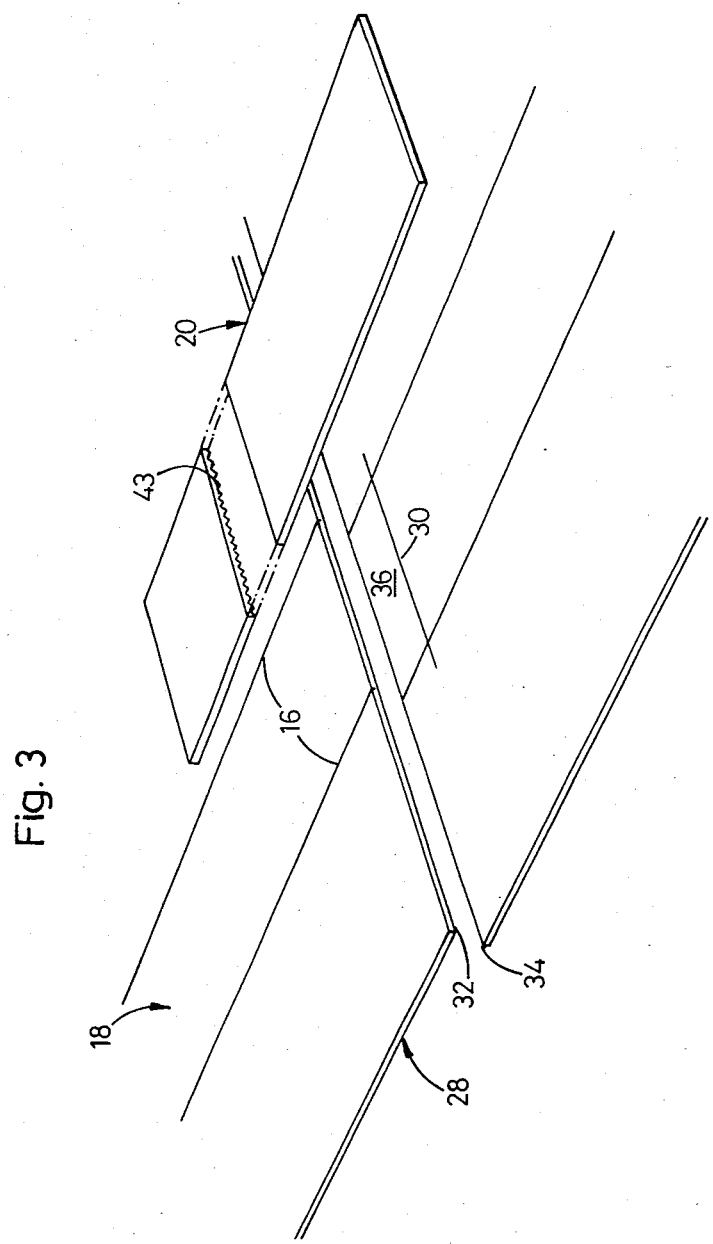
Figure 4:
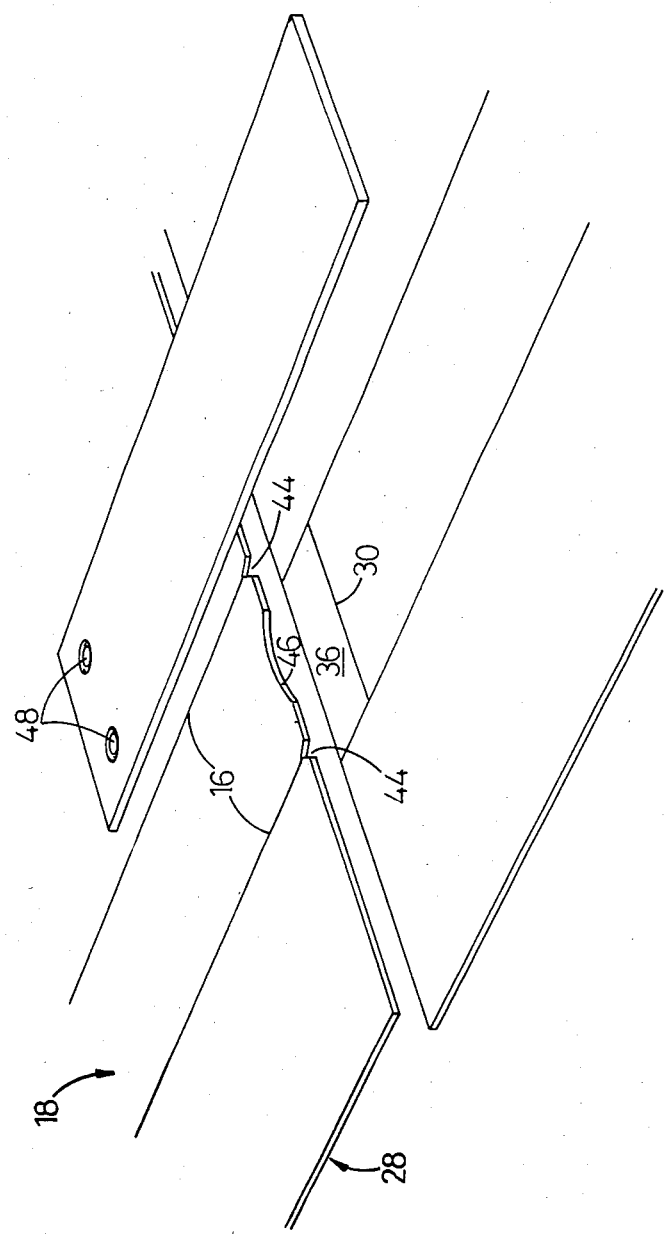
Figure 5:
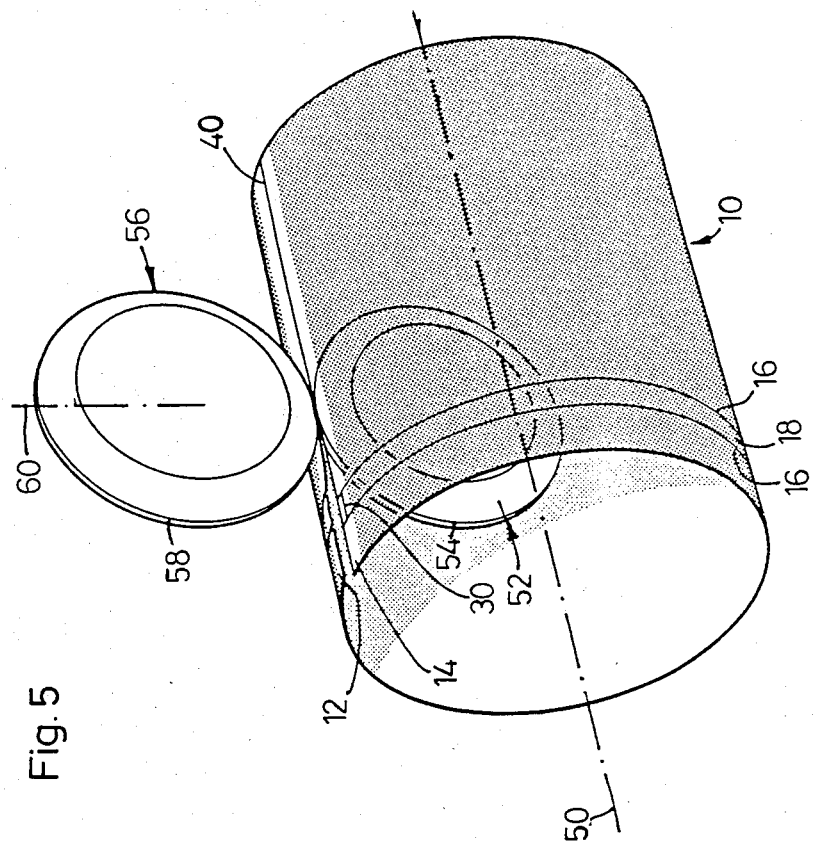
Figure 6:
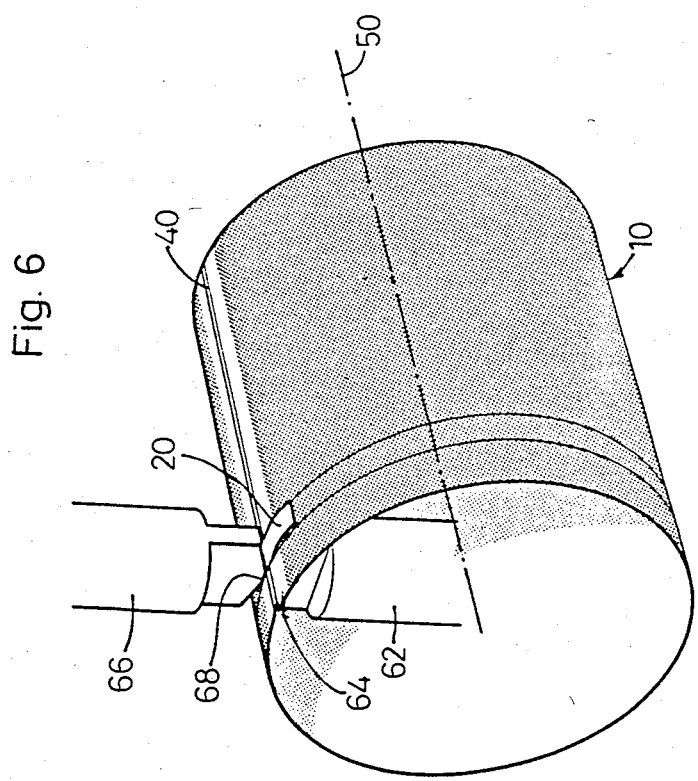

FIG. 1 shows a can for preserving food with a can body according to the invention, during the opening of the can, FIG. 2 shows an enlarged detail from FIG. 1, FIG. 3 shows parts of the can body before the welding, FIG. 4 shows parts of the can body with details modified in comparison with FIG. 3, and FIGS. 5 and 6 shows successive welding operations on the can body.

A can body 10, which consists, for example, of tin plate with a thickness a of 0.2 mm, is illustrated in the drawings. The can body 10 has an outer longitudinal edge 12 and an inner longitudinal edge 14 as well as a pair of circumferential scorings 16 which extend at right angles to these longitudinal edges and define a tearing strip 18 between them. The can body 10 further includes an elongated rectangular tongue 20 which consists, for example, of tin plate with a thickness b of 0.4 mm and extends the tearing strip 18 beyond the outer longitudinal edge 12.

According to FIG. 1, the can body 10, which here has a substantially rectangular cross-section, is opened with a key 22. The key 22 has been placed on the tongue 20 and is rolled on one of two beaded edges 24 which unite the can body 10 with a cover or bottom 26.

The can body 10 is produced from a sheet-metal blank 28 which is originally planar as shown in FIGS. 3 and 4 and which is first rolled to form a cylinder, as indicated by a circle in FIG. 1, regardless of the cross-sectional shape of the finished can. The two circumferential scorings 16 and a starting scoring 30 are stamped into the still planar sheet-metal blank 28. The two circumferential scorings 16 extend from the edge 32 of the outer longitudinal edge 20 to the edge 34 of the inner longitudinal edge 14. The starting scoring 30 extends parallel to the edge 34 and defines a rectangle 36 with this and the adjacent portions of the circumferential scorings 16. The width of this rectangle, that is to say the spacing c of the starting scoring 30 from the edge 34, is preferably 1.0 mm if the two longitudinal edges 12 and 14 are to be welded to one another in such a manner that they overlap over a width of 0.4 mm, as is usual with a sheet-metal thickness of 0.2 mm.

According to FIGS. 2 and 3, the starting scoring 30 extends beyond each of the two circumferential scorings 16 by a distance d which is about 0.5 mm long and so amounts to about 2.5 times the sheet-metal thickness a. During the rolling up of the tongue 30, cracks 38 form which originate from the two ends of the starting scoring 30 and each of which gradually leads into the adjacent circumferential scoring 16 as shown in FIG. 2; the end lies in the region of the welding seam 40 which connects the two longitudinal edges 12 and 14 to one another. From this end, the further tearing operation follows the two circumferential scorings 16 as illustrated in FIG. 1.

The tongue 20 is as wide as the spacing between the two circumferential scorings 16 and, according to FIG. 2, is connected to this in a welding zone 42 which extends over approximately 90% of the distance between the two circumferential scorings 16. In the welding zone 42, the tongue 20 is provided with preformed profiling, that is to say profiling which is present before it is welded on, which according to FIG. 3 is formed by sharp-edged longitudinal ribs 43, and is pressed more or less flat during the welding.

The details illustrated in FIG. 4 are modified in comparison with FIG. 3 in that the outer longitudinal edge 12 comprises a notch 44 at the beginning of each of the two circumferential scorings 16 and a sickle-shaped recess 46 between these notches. A pair of pips 48 is formed on the tongue 20 as profiling, each of which pips is comparatively closely adjacent to a respective one of the longitudinal edges of the tongue and ensures that the tongue is welded to the beginning of the tearing strip 18 up to the immediate vicinity of its longitudinal edges.

An apparatus which is suitable for welding the can body 10 has a stationary arm 50 on which an inner electrode roller 52 is mounted, the outer surface 54 of which is only slightly broader than 0.4 mm, the overlapping width of the two longitudinal edges 12 and 14.

Situated opposite the inner electrode roller 52 is an outer electrode roller 56 with a correspondingly narrow generated surface 58, which is mounted on a ram 60 which can be reciprocated radially in relation to the arm 50. The sheet-metal blank 28 is rolled round the arm 50 in conventional manner and conveyed through between the two electrode rollers 52 and 56, the welding seam 40 being formed between the two longitudinal edges 12 and 14 in the form of a lapped mash or seam weld.

Mounted on the arm 50 behind the inner electrode roller 52 in the direction of movement of the can body 10 being formed is a stationary inner electrode 62 which has a cylindrical current transfer surface 64 corresponding to the radius of curvature of the can body 10. Situated opposite this inner electrode 62 is an outer electrode 66 which has a current transfer surface 68 in the form of a knife edge and can be rhythmically reciprocated radially in relation to the can body 10 in order to weld the tongue 20 to the body.

We claim:

1. An openable can body (10) made from a sheet-metal blank (28) with
    an outer and an inner longitudinal edge (12 and 14 respectively) which are welded to one another in an overlapping manner,
    at least one pair of circumferential scorings (16), which extend around the can body (10) transversely to the longitudinal edges (12,14) and define a tearing strip laterally, and
    a tongue (20) which extends the tearing strip (18) beyond the outer longitudinal edge (12),
    characterized in that the inner longitudinal edge (12) and the outer longitudinal edge (14) of the blank are welded together with limited overlap to from a mash weld; and
    the tongue (20) is welded, as a separate sheet-metal part, to the outer longitudinal edge (12) by means of a separate weld overlying the mash weld.

2. A can body as claimed in claim 1, characterised in that the thickness (b) of the tongue (20) is of sheet-metal having a thickness greater, preferably 1.5 to 2.5 times as great, as the thickness (a) of the sheet-metal blank (28).

3. A can body as claimed in claim 1, characterised in that the tongue (20) consists of sheet-metal having a greater strength than the sheet-metal blank (28).

4. A can body as claimed in claim 1, characterised in that the tongue (20) has a preformed profiling at least in a welding zone (42) in which it is welded onto the outer longitudinal edge (12).

5. A can body as claimed in claim 4, characterised in that the profiling is formed by sharp-edged longitudinal ribs (43) on the tongue (20).

6. A can body as claimed in claim 1, having a starting scoring (30) between the circumferential scorings (16) in the region of the inner longitudinal edge (14), characterised in that the starting scoring (30) has a spacing (c) from the outer longitudinal edge (12) which is three to seven times, preferably five times as great as the thickness (a) of the sheet-metal blank (28).

7. A can body as claimed in claim 6, characterised in that the starting scoring (30) extends beyond the two associated circumferential scorings (16) by a distance (d) which is two to three times as great as the thickness (a) of the sheet-metal blank (28).

8. A can body as claimed in claim 1, characterised in that the tongue (20) is welded to the outer longitudinal edge (12) over 85 to 95% of the width of the tearing strip (18).

9. A can body as claimed in one of the claims 1 to 8, characterised in that the outer longitudinal edge (12) comprises a notch (44) at the beginning of each of the circumferential scorings (16).

* * * * *